United States Patent Office 3,053,641
Patented Sept. 11, 1962

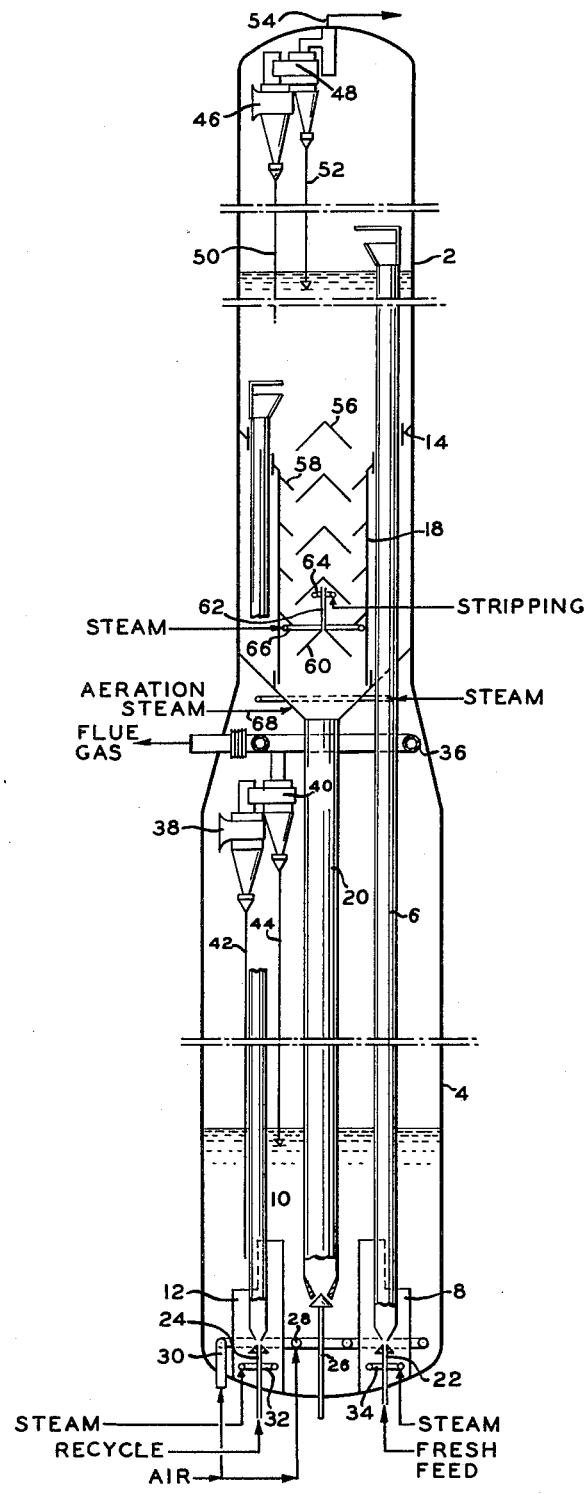

3,053,641
FLUID SYSTEMS FOR CONTACTING SOLID PARTICLE MATERIAL WITH GASEOUS AND VAPOROUS MATERIAL
Roland L. Nagy, Clifton, and Louis F. Rice, Ridgewood, N.J., assignors to The M. W. Kellogg Company, Jersey City, N.J., a corporation of Delaware
Filed Mar. 11, 1960, Ser. No. 14,347
8 Claims. (Cl. 23—288)

This invention relates to improvements in fluid systems for contacting finely divided solid particle material with gaseous and vaporous material. More particularly, the invention relates to the apparatus for handling finely divided solid particle material in a fluidized condition and contacting with vaporous and gaseous material.

The present invention is especially applicable to a fluidized catalytic cracking system and apparatus for the treatment of hydrocarbon oils under selected elevated temperature cracking conditions to effect conversion of the oils to desired products.

In the conversion of hydrocarbon oils in one or more fluidized catalytic cracking zones or chambers, the catalyst and hydrocarbons are maintained in contact at desired elevated temperatures for a time sufficient to carry out the desired degree of conversion during which time the catalyst particles become contaminated with volatile and non-volatile carbonaceous products which must be removed in order that the catalyst particles may be recycled and reused in the conversion of additional hydrocarbon oil feeds.

Accordingly, the contaminated catalyst is passed through a series of catalyst contaminants removal zones wherein volatile carbonaceous material is first removed and thereafter non-volatile carbonaceous deposits are removed. Generally, non-volatile carbonaceous material and any unstripped volatile material is removed from the catalyst by burning in the presence of an oxygen-containing gas in a regeneration zone under elevated temperature conditions whereby the catalyst becomes reactivated and reheated to an elevated temperature suitable for recycle to the hydrocarbon conversion steps of the process.

One of the important aspects of any fluid system involving a reactant material and finely divided catalytic material relates to the separation and recovery of reactant product material from the catalytic material in a thorough and efficient manner. Accordingly, in the hydrocarbon conversion system of this invention, recovery of entrained hydrocarbons and vaporizable adsorbed hydrocarbons from the catalyst is of prime importance and adds to the overall efficiency of the system.

A principal object of this invention is to provide a system and apparatus of simple, compact and economical design, as well as of high operating efficiency for the catalytic conversion of hydrocarbon oil feeds and the recovery of valuable hydrocarbon constituents from the catalyst.

Another object of this invention is to provide a system for effectively stripping a stream of contaminated catalytic particles for the recovery of hydrocarbon conversion products under conditions to substantially eliminate any recycling of contaminated catalyst from the stripping zone to the hydrocarbon conversion zone wthout first passing through a regeneration zone.

A further object of this invention is to provide an integral vessel system comprising hydrocarbon conversion chambers which permit varying the severity of cracking of different hydrocarbon feed materials associated with a common stripper chamber and a common regenerator chamber.

Other objects and advantages of the system and apparatus of this invention will become apparent from the following description and specific examples presented herein.

Referring now to the drawings, there is shown a unitary and integral vessel provided with an upper reactor-separator chamber 2, and a lower regenerator chamber 4. At least one first riser-reactor conduit 6 is shown extending substantially vertically upward from within a cylindrical well 8 in the bottom portion of the regenerator chamber 4 to the intermediate portion of the reactor separator chamber and external to the stripper chamber positioned between the reactor chamber and a regenerator chamber. At least one second riser-reactor conduit 10 is shown extending from within a cylindrical well 12 in the bottom portion of the regenerator chamber 4 substantially vertically upwardly external to said stripper chamber and terminating in the bottom portion of said reactor-separator chamber. In a specific embodiment there are two fresh feed riser-reactors extending to the intermediate portion of the reactor chamber and one recycle feed riser-reactor extending into the bottom portion of the reactor chambers. The riser conduits pass through conical head members 14 and 16 with conical head member 14 connecting the top of the stripper chamber 18 with the bottom of the reactor chamber 2. The bottom of the stripper chamber is connected to downwardly sloping conical head member 16 which forms the upper head member of the regenerator chamber and is connected adjacent to the apex thereof to an open end standpipe 20 extending downwardly into the bottom portion of the regenerator chamber such that the top of the standpipe is in open communication with the stripper chamber and the bottom of the standpipe terminates below the upper open end of wells 8 and 12. Associated and aligned with the bottom open end of riser conduit 6 is a vertically movable hollow stem plug valve 22 and with riser conduit 10 is a vertically movable hollow stem plug valve 24. A vertically movable plug valve 26 is aligned with the bottom open end of standpipe conduit 20. Positioned in the bottom portion of the regenerator chamber are at least two horizontally disposed and independently controlled air distributor manifolds or rings 28 and 30. In the bottom portion of the wells 8 and 12 are provided distributor rings 32 and 34 for introduction and distribution of a gaseous material such as steam. The wells 8 and 12 surrounding the bottom portion of the risers 6 and 10 are extended upwardly on the side adjacent to the standpipe to reduce the tendency of contact material discharged from the standpipe to pass directly into the well before it has been sufficiently regenerated as herein described. Provided in the upper portion of the regenerator chamber is a plenum chamber 36 from which flue gases are withdrawn after passing through cyclone separators 38 and 40 having diplegs 42 and 44. The removal of entrained solid fines from the regenerator flue gases is accomplished in the cyclone separators and the removed fines are returned to a fluid bed of solid material in the lower portion of the regenerator. A similar set of cyclone separators 46 and 48 having diplegs 50 and 52 are provided in the upper portion of the reactor-separator chamber for the recovery and return of entrained solids in the product vapors to a dense fluid bed of contact material in the lower portion of the reactor chamber. Product vapors are withdrawn from the top of the vessel by conduit 54.

As herein indicated, a relatively dense fluid bed of finely divided solid particle material such as finely divided catalytic cracking material is maintained in the lower portion of each of the reactor chambers and the regenerator chamber with the solid particle material transferred between chambers by risers 6 and 10, stripping chamber 18 and standpipe 20. The upper level or meniscus of a relatively dense fluid bed of contact material in the reactor chamber is maintained below and may be up to about 5 feet below or even up to the elevation of the discharge of riser 6 which terminates in an intermediate portion of the reactor-separator chamber. The upper end or discharge end of each riser conduit is provided with a suitable discharge means which will change the direction of flow of the suspension in the riser and reduce the velocity of the suspension of finely divided solid particle material and reactant material passing upwardly through the risers below about 75 feet per second upon discharge from the risers. The discharge means of the riser conduits may be any suitable arrangement which will deflect the solid particle material and vaporous material away from the walls of the reactor vessel and toward the central portion of the fluid bed therein. That is, the discharge means may be formed by providing a plurality of elongated slots at the capped discharge end of the riser with the slots having a combined area of at least twice the cross-sectional area of the riser and spaced on the periphery of the riser away from that portion adjacent to the wall of the reactor. In another arrangement the discharge end or top portion of the riser is gradually increased or enlarged in cross-sectional area to effect a partial reduction in velocity of the upwardly flowing solids and vaporous material within the riser-reactor and prior to being discharged from the riser into the enlarged reactor-separator chamber. In this embodiment the upper enlarged end of the riser is capped with a spaced apart impervious or solid L shaped baffle member to provide an opening into the inner central portion of the reactor and closed in the area adjacent to the reactor wall such that the discharge solids and vaporous material will be directed away from the reactor wall.

In the system herein described suitable hydrocarbon feed materials heated to an elevated temperature are passed through the riser-reactors and mixed with sufficient hot regenerated catalyst to effect conversion of the hydrocarbon feed material. In this specific embodiment fresh hydrocarbon feed material is mixed with hot regenerated catalytic material and passed as a relatively dilute suspension upwardly through riser conduit 6 at a suitably elevated temperature in the range of from about 900° F. to about 1050° F., preferably about 1000° F. to accomplish the desired degree of conversion of the fresh feed. This fresh feed riser discharges above the relatively dense fluid bed of catalytic material maintained in the lower portion of the reactor chamber such that upon discharge from the riser the finely divided catalytic material separates from the vaporous hydrocarbon products by the combined action of reduced pressure and velocity of the suspension such that the catalytic material settles out and falls onto the upper level or meniscus of the relatively dense fluid bed therebelow. The recycle oil is mixed with a suitable quantity of hot freshly regenerated catalytic material and passed at an elevated temperature in the range of from about 800° F. to about 1050° F., preferably about 850° F., upwardly through riser conduit 10 which discharges into the lower or bottom portion of the dense fluid bed of catalytic material in the reactor chamber. As a consequence of the conversion of hydrocarbons within the riser-reactors, as well as in the dense fluid bed of catalytic material in the reactor chamber, volatile and non-volatile carbonaceous material deposits on the catalyst, thereby reducing its activity. In the system and apparatus of this invention, there is provided beneath the reactor chamber in open communication and contiguous therewith, a stripping chamber 18 which is coaxially aligned with the reactor chamber and provides a continuous fluid bed of solid contact material from the upper level or meniscus of the bed of solid material in the reactor compartment to the bottom of the stripping chamber of varying density.

With respect to changes in density, the bed of catalytic material in the reactor chamber will have a density which may be in the range of from about 25 to about 45 pounds per cubic foot with the catalyst or solid contact material in the stripper chamber being in a series of zones of relatively low and high density ultimately reaching a relatively high density region in the range of from about 30 to about 50 pounds per cubic foot in the bottom portion of the stripper. One of the important aspects of this arrangement of reactor and stripper design relates to the coactive stripping effects obtainable and the minimization of added gaseous stripping material required in the process. That is, the continuous relatively dense fluid bed of catalytic material in the reactor and stripper performs a dual function of providing relatively long time cracking of heavy and difficulty vaporizable hydrocarbon materials adsorbed on the catalytic material and this dense fluid bed of material also functions as a stripper. That is, the catalytic material discharged from the fresh feed riser-reactor is contaminated with non-volatile carbonaceous material as well as difficulty vaporizable carbonaceous material. The fresh feed is relatively non-volatile as compared to cracked products, hence, the recycle vapors and their products of cracking, in addition to the gaseous material passed through the bed from the stripper compartment effect stripping of the spent catalyst deposited into the fluid bed from the riser-reactors. In addition to this stripping action there is provided at least three additional stages of stripping within the stripping chamber by providing many changes in the direction of flow of catalyst and gaseous stripping material with the catalyst velocity in the most restricted areas being sufficiently low to assure countercurrent flow of finely divided catalytic material and gaseous material passing therethrough. That is, the downward velocity of the catalytic material in the restricted areas is to be less than about 1.5 feet per second and the cross-sectional area of the most restricted areas is to be not more than about 50 percent of the total cross sectional area of the stripping chamber. To accomplish the above, the stripping compartment of this embodiment is provided with a plurality of alternately staggered downwardly sloping conical and frusto conical baffle members 56 and 58 with the apex of the uppermost conical baffle member 56 being below the discharge of riser conduit 10 and on a horizontal plane substantially coinciding with the junction of the vertical side and conical bottom of the reactor chamber. The baffles are inclined at an angle of at least about 30 degrees and preferably at an angle greater than the angle of repose of the catalyst to prevent hold-up and accumulation of the catalyst on the baffle members. The lowermost conical baffle member 60 within the stripper chamber is spaced a substantial distance above the bottom thereof and is provided with an open end conduit or confined passageway 62 extending from its apex to substantially the apex of the conical baffle member positioned thereabove. By this improved arrangement, disengaging of gaseous material from the catalytic material in the bottom portion of the stripping zone and beneath the lowermost conical baffle member is greatly improved by venting the gaseous material to a region of reduced pressure in an upper portion of the stripping chamber. In addition to the above, gaseous stripping material is introduced to the stripping chamber substantially above the bottom thereof and above the lowermost conical baffle member through a plurality of vertically spaced apart distributor means 64, 66 and 68 with the lowermost being primarily aeration or fluffing gaseous material which increases the volume of gaseous stripping material in the upper portion of the stripping chamber as well as in the fluid bed in the reactor and effectively improving stripping of hydrocarbons from the catalytic material. By this novel combination and improved arrangement of apparatus features, a plurality of relatively dense and less dense catalyst stripping sections are provided within the stripping compartment and the quantity of fluidizing and stripping gaseous material is minimized since all of the vapors and gaseous material separated from the catalytic material eventually pass upwardly through the relatively dense fluid bed of catalytic material in the reactor compartment, thereby assisting in separating cracked products of reaction from the catalyst and maintaining the catalyst in a fluidized condition in the reactor compartment above hte stripper compartment.

The stripped catalyst particles, substantially free of gaseous stripping material because of the improved gaseous material disengaging zone in the lower portion of the stripping compartment beneath the lowermost baffle member, pass from the bottom of the stripping compartment into the open upper end of the standpipe communicating therewith and pass downwardly to the lower portion of a dense fluid bed of catalytic material in the regeneration compartment. In the regeneration compartment the fluid bed of contaminated catalytic material is treated with an oxygen-containing gas introduced by manifolds 28 and 30 to remove carbonaceous deposits from the catalyst by burning, thereby reheating the catalyst to an elevated temperature and sufficiently restoring its activity for recycle to the riser-reactor inlets, as hereinbefore described.

One of the important aspects of the improved apparatus of this invention to provide an apparatus of simple and economical design relates to the method and means for supporting the reactor chamber and stripping chamber above the regenerator chamber. In this arrangement of apparatus the reactor chamber is formed from an elongated cylindrical shell which is directly attached to and supported by the regenerator shell with at least two spaced apart and downwardly sloping frusto-conical baffle members rigidly attached to and hung from the cylindrical shell to provide the bottom of the reactor chamber and the top of the regenerator chamber. The cylindrical stripping chamber of smaller diameter than the reactor chamber is confined within the elongated reactor shell and supported by being rigidly attached at its upper periphery to the bottom of the frusto-conical baffle member forming the bottom of the reactor chamber. The bottom end or periphery of the cylindrical stripping section is connected to the lower frusto-conical baffle member by a suitable non-rigid joint means which will permit movement due to expansion and contraction of the vessel. In a similar manner the standpipe receives support by being rigidly attached to the lower frusto-conical baffle member forming the top of the regenerator chamber. This simplified design and arrangement of fabrication for separating and supporting the different compartments of the unitary vessel is of marked importance in providing the economical and simplified apparatus of this invention.

The principal conditions of operation such as time, temperature and pressure governing the conversion of hydrocarbonaceous material in the presence of finely divided solid catalytic material to lower boiling range products may be varied over a relatively wide range of conditions which will depend for the most part upon the type of hydrocarbon feed material being treated and the extent of conversion desired. It is contemplated, therefore, operating the regenerator at a temperature in the range of from about 1000° F. to about 1400° F., preferably from about 1050° F. to about 1150° F., in order that the riser-reactors may be maintained or operated over a relatively wide temperature range of from about 800° F. to about 1050° F. and preferably from about 850° F. to about 1000° F. Generally the relatively dense fluid bed of catalyst maintained in the lower portion of the reactor chamber will be maintained at a lower temperature than the temperature in the riser-reactor which discharges above the dense fluid bed and will be maintained in the range of from about 10° F. to about 200° F., usually from about 40° F. to about 100° F. lower than the riser temperature. However, it is contemplated in the apparatus of this invention and the method of operation of operating under conditions to maintain the temperature of the dense fluid bed at a temperature in the range of from about 10° F. to about 200° F. higher than the temperature employed in the fresh feed riser which terminates above the upper dense bed level. The time of contact of the hydrocarbon feed with the catalyst will depend upon the particular feeds being treated and may be in the range of from a few seconds such as a fraction of a second up to about 10 seconds, depending upon the refractivity of the hydrocarbon undergoing treatment, catalyst to oil ratio employed, as well as the temperature employed. Accordingly, it is contemplated employing catalyst to oil ratios in the risers within the range of from about 5 to about 25 to 1 and superficial velocities in the range of from about 10 to about 100 feet per second. Generally superficial gas velocities in the riser-reactors will be in the range of from about 10 to about 75 feet per second with the velocities employed in the dense fluidized bed phase being maintained in the range of from about 1 to about 3 feet per second.

It is quite evident from the discussion hereinbefore presented that the improved arrangement of apparatus provides a system of desired flexibility for the conversion of different hydrocarbon feed materials and the recovery of conversion products. Feed materials which may be employed in the apparatus of this invention include relatively high boiling hydrocarbons such as total crudes or fractions thereof, residual oils, topped and reduced crudes, and recycle fractions thereof. It is contemplated, therefore, introducing fresh gas oil feed material to one or more riser-reactors which terminate above the dense fluid bed of catalytic material with a recycle oil feed being introduced to the riser which terminates in the lower portion of the dense catalyst bed and under some circumstances the recycle oil may be introduced directly into the dense fluidized catalytic bed with the riser terminating in the bottom portion of the catalytic bed being employed to pass desired quantities of hot freshly regenerated catalyst into the bed of catalytic material to maintain a desired temperature. Similarly, residual oils or reduced crudes may be introduced to the riser-reactors to accomplish the desired contact time to produce desired products.

The finely divided solids utilizable in the apparatus of this invention are those which are capable of being regenerated, which substantially retain their solid subdivided state under the conditions to which they are exposed in the system and those which are realtively easily handled in the cyclic system of the apparatus herein described. Those solids which are utilizable in the apparatus of this invention include naturally occurring or synthetically prepared cracking catalysts including activated clays, synthetically prepared silica and silica alumina containing catalysts with or without the addition of suitable cracking promoters. In addition, it is contemplated employing in the system or apparatus of this invention a mixture of finely divided solid particle material including finely divided inert material such as sand, pumice, spent cracking catalyst, clays, petroleum, coke, etc., either alone or in conjunction with a catalytic material in suitable proportions. For example, a mixture of naturally occurring and/or synthetically prepared catalyst may be employed alone or with an inert diluent material.

To illustrate the improved apparatus of this invention and its method of operation as applied to a typical large scale commercial unit, reference is had by way of example to the following table of data representing preferred operating conditions and vessel dimensions for a fluid catalytic cracking unit design to process about 5900 barrels per stream day (b.p.s.d.) of fresh oil feed having a gravity of about 22.5° API.

| | |
|---|---|
| Reactor I.D. | 11 ft. |
| Stripper I.D. | 5 ft. 6 in. |
| Reactor stripper height (approx.) | 52 ft. |
| Regenerator I.D. | 15 ft. |
| Regenerator height | 38 ft. |
| Riser 6 I.D. | 22 in. |
| Riser 10 I.D. | 14 in. |
| Standpipe I.D. | 26 in. |
| Reactor pressure | 10 p.s.i.g. |
| Reactor bed temperature | 900° F. |
| Reactor catalyst bed height | 0–15 ft. |
| Stripper temperature | 900° F. |
| Regenerator pressure | 19 p.s.i.g. |
| Regenerator temperature | 1125° F. |
| Regenerator catalyst bed height | 7–15 ft. |

Having thus provided a description of the apparatus and system of this invention, as well as presented preferred embodiments thereof, it is to be understood that no undue restrictions are to be imposed as a result thereof since minor modifications to the apparatus may be made without departing from the spirit or scope of the invention.

We claim:

1. A unitary apparatus comprising in combination, an upper cylindrical reactor chamber, an intermediate cylindrical stripping chamber and a lower cylindrical regenerator chamber, each of said chambers adapted to contain a relatively dense fluid bed of finely divided solid particle material therein, said stripping chamber in open communication with said reactor chamber and extending downwardly from the bottom of said reactor chamber, an open end standpipe extending downwardly from said stripping chamber through said regenerator chamber to the lower portion thereof, at least one first riser conduit extending from the lower portion of said regenerator chamber substantially vertically upwardly through said regenerator chamber into the lower portion of said reactor chamber and external to said stripping chamber, at least one second riser conduit extending from the lower portion of said regenerator chamber substantially vertically upwardly through said regenerator chamber into the intermediate portion of said reactor chamber and external to said stripping chamber, said stripping chamber provided with a plurality of alternately staggered downwardly sloping conical and frusto-conical baffle members with the uppermost conical baffle member being positioned in the bottom portion of said reactor chamber and the lowermost conical baffle member being positioned a substantial distance above the bottom of the stripping chamber to provide a disengaging compartment in the bottom portion of said stripping chamber, said lowermost conical baffle member being provided with an open end conduit extending from the apex thereof upwardly into an upper portion of said stripping chamber, a plurality of vertically spaced apart independently controlled means for introducing gaseous material to said stripping chamber, means for introducing reactant material to the bottom portion of each of said riser conduits, means for introducing gaseous material to the bottom portion of said regenerator chamber, and means for removing gaseous material from the upper portion of said reactor chamber and said regenerator chamber.

2. An apparatus comprising an elongated substantially vertical cylindrical reactor chamber positioned above and in open communication with a lower elongated cylindrical stripping chamber of smaller diameter than said reactor chamber, a plurality of vertically spaced conical baffle members coaxially positioned with respect to said reactor chamber and said stripper chamber of a diameter which will restrict not more than about 50 percent of the cross-sectional area of said stripping chamber, the lowermost conical baffle member being spaced a substantial distance above the bottom of said stripping chamber, said lowermost conical baffle member being attached at its apex to an open end conduit extending substantially vertically upwardly to substantially the apex of the conical baffle member next above, means for introducing an aerating gaseous material to the bottom portion of said stripping chamber beneath said lowermost conical baffle member, means for separately introducing stripping gaseous material to said stripping chamber at a plurality of vertically spaced apart points above said lowermost conical baffle member, means for maintaining a relatively dense fluid bed of finely divided contact material extending from the intermediate portion of said reactor chamber continuously downwardly to the bottom of said stripping chamber, means for passing contact material from the bottom portion of said stripping chamber to a regeneration chamber, means for passing contact material from said regenerator chamber to the upper and lower portions of said reactor chamber and means for removing substantially all of the stripped gaseous material introduced to said stripping chamber from the upper portion of said reactor chamber.

3. A unitary vessel comprising an upper elongated cylindrical reactor chamber and a lower elongated cylindrical regenerator chamber of larger diameter than said reactor chamber, said reactor chamber separated from said regenerator chamber by at least two vertically spaced apart inverted frusto-conical baffle members with the uppermost baffle member forming the bottom of the reactor chamber and the lowermost baffle member forming the top of the regenerator chamber, an elongated open end conduit attached to the bottom periphery of the lowermost frusto-conical baffle member extending downwardly to the lower portion of said regenerator chamber, an elongated cylindrical baffle member of smaller diameter than said reactor chamber attached to the bottom periphery of the uppermost frusto-conical baffle extending downwardly to the lowermost frusto-conical baffle member thereby forming a stripping chamber lying intermediate the reactor chamber and the regenerator chamber, a plurality of substantially vertical conduits extending from the lower portion of the regenerator chamber upwardly through said vessel to the lower and intermediate portions of said reactor chamber, a conical baffle member confined within and positioned a substantial distance above the bottom of said stripping chamber attached at its apex to an open end conduit extending substantially vertically upwardly to an upper portion of said stripping chamber, a second conical baffle member positioned in the lower portion of said reactor chamber above said cylindrical stripping chamber to form an annular passageway between said reactor chamber and said stripper chamber having a cross-sectional area not less than about 50 percent of the cross-sectional area of said stripping chamber, the apex of said second conical baffle member being below the point of discharge of said riser extending into the lower portion of the reactor chamber, means for introducing gaseous stripping material at a plurality of vertically spaced points in said stripping chamber above said lowermost conical baffle member, means for introducing gaseous material to the bottom portion of said regenerator chamber and said plurality of substantially vertical conduits, and means for removing gaseous material from the upper portion of said regenerator chamber and reactor chamber.

4. A unitary apparatus comprising in combination an upper reactor chamber and a lower regenerator chamber, the bottom of said reactor chamber and the top of said regenerator chamber being formed by separate vertically spaced apart inverted frusto-conical baffle members, an open end standpipe extending downwardly from the lowermost frusto-conical baffle member to the lower portion of said regenerator chamber, a vertically movable plug valve aligned with the bottom of said standpipe, an open end cylindrical baffle member of smaller diameter than said reactor chamber rigidly attached to the bottom periphery of the uppermost frusto-conical baffle and non-rigidly attached to the lowermost frusto-conical baffle to form a stripping chamber and on open passageway with said standpipe between said reactor chamber and said regenerator chamber, a first riser conduit extending from the bottom portion of said regenerator chamber substantially vertically upwardly and terminating in the lower portion of the reactor chamber in an annular area defined by the uppermost frusto-conical baffle member, a second riser conduit extending upwardly through said frusto-conical baffle members from the lower portion of said regenerator chamber and terminating in the intermediate portion of the reactor chamber above the upper level of a relatively dense fluid bed of particle material therebelow, the terminus of said riser conduits being provided with means to deflect particle material flowing upwardly through said risers away from the reactor chamber wall, said stripping chamber provided with a plurality of alternately staggered downwardly sloping conical and frusto-conical baffle members with the lowermost conical baffle member spaced a substantial distance above the bottom of the stripping chamber to form a disengaging chamber, the lowermost conical baffle member being vented by an elongated open end conduit extending upwardly therefrom to an upper portion of said stripping chamber, means for separately introducing stripping gas to said stripping chamber at a plurality of vertically spaced points above said lowermost conical baffle member, means for introducing gaseous material to the bottom portion of said regenerator chamber and said riser conduits, and means for removing gaseous material from the upper portion of said reactor and regenerator chambers.

5. The apparatus of claim 4 wherein the non-rigid attachment between the cylindrical stripper baffle and the lowermost frusto-conical baffle member is sealed against gaseous flow therethrough.

6. The apparatus of claim 4 wherein a portion of the riser conduit adjacent its terminus is gradually increased in cross-sectional area to cause a reduction in velocity in particle material passing upwardly therethrough and is capped with a solid L shaped baffle member open to the inner portion of the reactor chamber but impervious to flow in a direction toward the reactor chamber wall.

7. The apparatus of claim 4 wherein two diametrically positioned first riser conduits are employed in conjunction with two diametrically positioned second riser conduits with said riser conduits extending upwardly from within separate cylindrical wells positioned in the bottom portion of said regenerator chamber and spaced substantially uniformly around said standpipe.

8. The apparatus of claim 4 wherein the terminus of the riser conduits is capped and provided with a plurality of elongated open slots in the riser periphery non-adjacent to the reactor chamber walls with the combined area of said open slots being greater than the cross-sectional area of said riser conduit.

References Cited in the file of this patent

UNITED STATES PATENTS

| | | |
|---|---|---|
| 2,488,028 | Scheinemann | Nov. 15, 1949 |
| 2,671,102 | Jewell | Mar. 2, 1954 |
| 2,895,811 | Schaaf | July 21, 1959 |
| 2,900,329 | Osborne et al. | Aug. 18, 1959 |
| 2,919,244 | Osborne | Dec. 29, 1959 |